US012666479B2

(12) United States Patent
Winston et al.

(10) Patent No.: US 12,666,479 B2
(45) Date of Patent: Jun. 23, 2026

(54) SYSTEMS AND METHODS FOR MANAGING A PLURALITY OF SHORT-RANGE WIRELESS CONNECTIONS WITHIN A VEHICLE

(71) Applicant: RAVE Aerospace, LLC, Brea, CA (US)

(72) Inventors: Joseph Winston, Brea, CA (US); Tinku Rasheed, Wessling (DE); Eriza Fazli, Gilching (DE)

(73) Assignee: RAVE Aerospace, LLC, Brea, CA (US)

( * ) Notice: Subject to any disclaimer, the term of this patent is extended or adjusted under 35 U.S.C. 154(b) by 717 days.

(21) Appl. No.: 16/601,268

(22) Filed: Oct. 14, 2019

(65) Prior Publication Data

US 2020/0120733 A1 Apr. 16, 2020

Related U.S. Application Data

(60) Provisional application No. 62/745,180, filed on Oct. 12, 2018.

(51) Int. Cl.
*H04W 76/15* (2018.01)
*H04L 67/12* (2022.01)
(Continued)

(52) U.S. Cl.
CPC ............ *H04W 76/15* (2018.02); *H04L 67/12* (2013.01); *H04W 4/80* (2018.02); *H04W 48/20* (2013.01); *H04W 72/0453* (2013.01)

(58) Field of Classification Search
CPC .... H04L 67/12; H04W 4/80; H04W 72/0453; H04W 24/08; H04W 4/48; H04W 88/12; H04W 84/18; H04W 76/15; H04W 48/20
See application file for complete search history.

(56) References Cited

U.S. PATENT DOCUMENTS

2007/0064634 A1 * 3/2007 Huotari ................. H04W 48/20
455/67.11
2008/0112573 A1 5/2008 Huang
(Continued)

FOREIGN PATENT DOCUMENTS

CN 105828411 A 8/2016
CN 106792751 B 2/2020
(Continued)

OTHER PUBLICATIONS

Japan Patent Office, Office Action, Issued on Mar. 22, 2023.
(Continued)

*Primary Examiner* — Said M Elnoubi

(74) *Attorney, Agent, or Firm* — Umberg Zipser LLP; Ryan Dean

(57) ABSTRACT

Systems and methods are described for maximizing a number of short-range wireless connections within an aircraft or other vehicle. A controller can be used to dynamically assign a wireless device to an access point and a channel for connection to the wireless network of the vehicle. When the controller receives a request for connection by a third-party wireless device, the controller can assign the third-party wireless device to one of a plurality of access points disposed within the vehicle based on a location of the third-party wireless device within the vehicle, a location of other wireless devices within the vehicle, and a number of wireless devices connected to each of the access points.

3 Claims, 1 Drawing Sheet

(51) Int. Cl.
H04W 4/80 (2018.01)
H04W 48/20 (2009.01)
H04W 72/0453 (2023.01)

(56) References Cited

U.S. PATENT DOCUMENTS

| | | | |
|---|---|---|---|
| 2009/0161582 A1 | 6/2009 | Kammer et al. | |
| 2012/0243474 A1* | 9/2012 | Iyer ................... | H04L 63/1466 370/328 |
| 2014/0309806 A1 | 10/2014 | Ricci | |
| 2015/0281934 A1 | 10/2015 | Kawaguchi et al. | |
| 2016/0021488 A1* | 1/2016 | Viswanadham ...... | H04W 8/005 455/41.2 |
| 2018/0024725 A1 | 1/2018 | Penilla et al. | |
| 2018/0091985 A1* | 3/2018 | Thanayankizil .... | H04W 40/246 |
| 2018/0359698 A1* | 12/2018 | Patwardhan .......... | H04W 28/22 |
| 2019/0098478 A1* | 3/2019 | Rabii ...................... | H04W 4/80 |
| 2019/0253857 A1 | 8/2019 | Li et al. | |
| 2020/0314929 A1* | 10/2020 | Nam ....................... | H04W 4/00 |

FOREIGN PATENT DOCUMENTS

| | | |
|---|---|---|
| EP | 3286950 B1 | 6/2020 |
| JP | 2004007078 A | 1/2004 |
| JP | 2004128940 A | 4/2004 |
| JP | 2009124461 A | 6/2009 |
| JP | 2011188122 A | 9/2011 |
| JP | 2015536619 A | 12/2015 |
| JP | 2016039487 A | 3/2016 |
| JP | 2017500762 A | 1/2017 |
| WO | 2008004561 A1 | 1/2008 |
| WO | 2014076534 A1 | 5/2014 |
| WO | 2014091596 A1 | 6/2014 |
| WO | 2015088854 A1 | 6/2015 |
| WO | 2017138955 A1 | 8/2017 |
| WO | 2018000134 A1 | 1/2018 |

OTHER PUBLICATIONS

Korea Intellectual Property Office, International Preliminary Report on Patentability, Feb. 5, 2020, 7 pages.
China Patent Office, First Office Action, Jul. 18, 2023.
European Patent Office, Extended European Search Report, International Application No. 19870337.3, Jun. 2, 2022, 19 pages.
Manzoor et al., "An SDN Enhanced Load Balancing Mechanism for a Multi-Controller WiFi Network," 2018 1st International Conference on Power, Energy and Smart Grid (ICPESG), IEEE, Apr. 9, 2018, 5 pages.

* cited by examiner

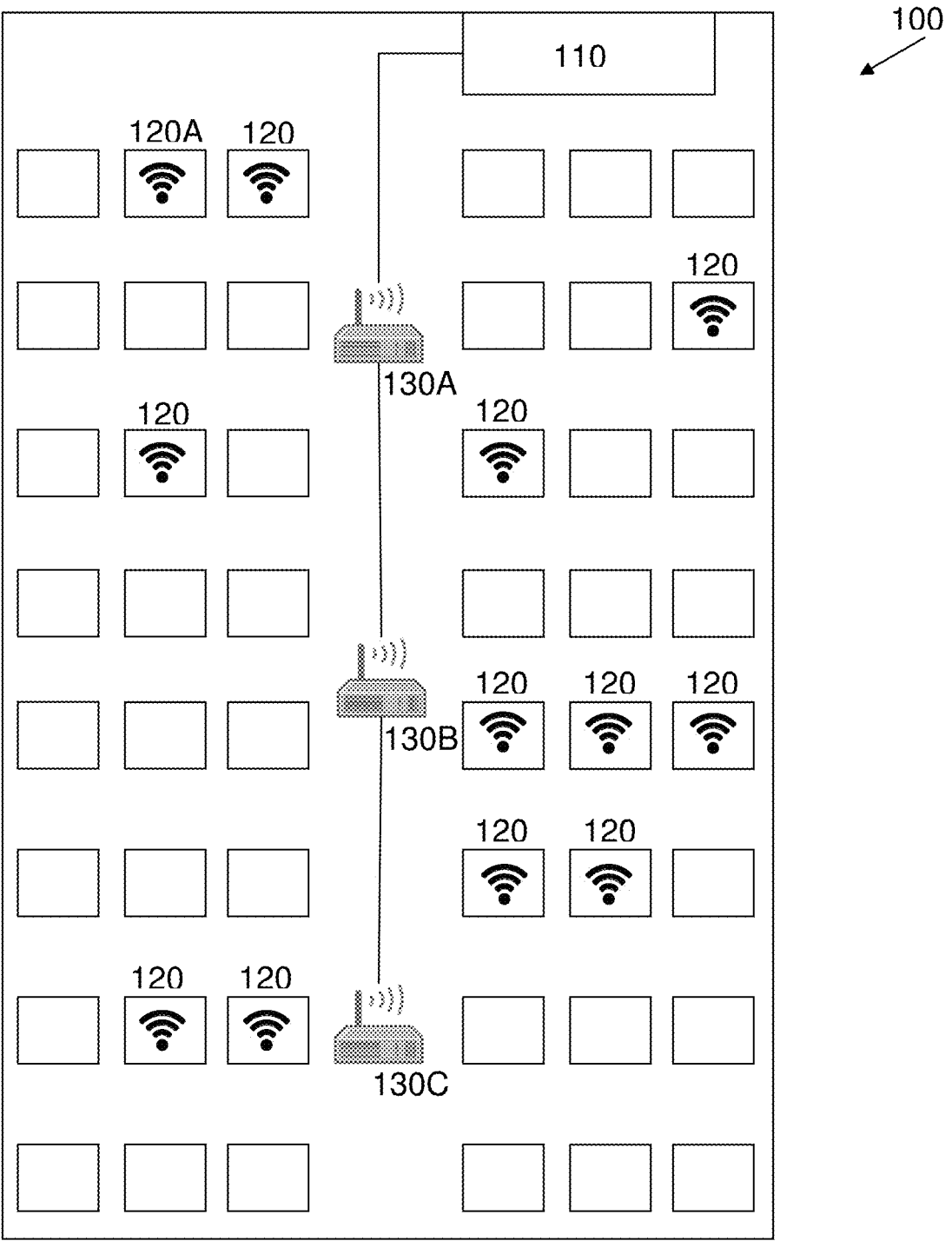

SYSTEMS AND METHODS FOR MANAGING A PLURALITY OF SHORT-RANGE WIRELESS CONNECTIONS WITHIN A VEHICLE

This application claims priority to U.S. provisional application having Ser. No. 62/745,180 filed on Oct. 12, 2018. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is management of wireless connections within a vehicle.

BACKGROUND

The following description includes information that may be useful in understanding the present invention. It is not an admission that any of the information provided herein is prior art or relevant to the presently claimed invention, or that any publication specifically or implicitly referenced is prior art.

As the number of wireless devices grows exponentially, the potential for interference among those devices within a specific spectrum grows. This is especially true in aircraft and other vehicles, where there is an unusually high density of such devices. One example is the popularity of the Bluetooth™ protocol for wireless connections, where it is often used for audio and other transmissions. In some wide-body aircraft, the density of Bluetooth connections in Economy Class can be approximately 2.2 per square meter. In addition, the Bluetooth spectrum (2.4 GHz) is typically shared with WiFi which airlines wish to use for provision of content to aircraft and passenger devices.

Systems and methods are needed to manage the large number of connections both to maximize the number of simultaneous connections within a vehicle, and permit users' seamless use of Bluetooth devices within the vehicle.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods for managing the number of Bluetooth audio simultaneous connections in a vehicle.

SUMMARY OF THE INVENTION

The inventive subject matter provides apparatus, systems and methods for maximizing a total number of simultaneous Bluetooth or other short-range wireless audio connections within an aircraft or other vehicle. Preferably, such systems utilize a controller that is configured to dynamically distribute the connected wireless devices in the 2.4 GHz band across a set of physical access points disposed within the vehicle, as well as across available channels, to thereby maximize a Bluetooth channel availability.

It is contemplated that the distribution of wireless devices across access points and channels should be periodically evaluated during a flight, for example, as passengers and their associated wireless device(s) may move during boarding and during the flight and different passengers may connect or disconnect wireless devices at different times during the flight, such that a preferred distribution of the wireless devices may change over time during the flight.

The system is preferably configured to negotiate Bluetooth audio connections to a lowest possible power level to minimize a transmission power of the wireless devices during protocol transmissions and a transmission power of aircraft device during protocol and audio transmissions.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1 is a diagram of one embodiment of a system for maximizing a total number of simultaneous Bluetooth or other short-range wireless audio connections within an aircraft.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Although the discussion herein focuses on an aircraft, it is contemplated that the systems and methods discussed herein could likewise be used on ships, trains, busses, and other vehicles.

Contemplated systems and methods described herein have a controller including a processor including one or more cores and a memory storing a set of instructions, such that the controller will prioritize wireless device connections to the 5 GHz band and out of the 2.4 GHz band. The systems can therefore provide independent and dynamic control of transmission power for an aircraft audio source.

In some embodiments, a system 100 for maximizing a total number of connections with an aircraft can include a controller 110 having a memory and processor. The memory preferably comprises a non-transitory computer readable storage medium for management of a plurality of wireless devices with the aircraft that includes the controller 110. The non-transitory computer readable storage medium preferably comprises a computer program that comprises instructions to facilitate the connection of wireless devices with the access points within the aircraft. The controller 110 is configured to receive a connection request by a wireless device 120A and assign the wireless device 120A to one of a plurality of access points 130A-130C disposed within the vehicle. Such assignment of the wireless device 120A is preferably based on a location of the wireless device 120A within the vehicle, a location of other wireless devices 120 within the vehicle, and a number of wireless devices connected to each of the access points 130A-130C.

To maximize the number of simultaneous connections within the vehicle, and especially the number of simultaneous Bluetooth connections, the controller 110 is configured to dynamically distribute the wireless devices 120 that are connected in the 2.4 GHz band across the set of physical access points 130A-130C disposed within the vehicle and further across the channels. This is especially important as passengers and their associated wireless devices 120 may move during boarding and during the flight, and passengers may connect or disconnect different wireless devices 120 during the flight. For these reasons, it is likely necessary that the controller 110 evaluates the distribution of wireless devices across the access points 130A-130C and channels periodically during a flight.

It is further contemplated that the controller 110 could be configured to reduce a transmission power of aircraft Bluetooth equipment to minimize the radius of frequency reuse as function of a number of passenger wireless devices 120 maintaining Bluetooth connections in a given geographic region of the vehicle.

The controller 110 can be further configured to implement a directional antenna for the aircraft Bluetooth equipment such that a transmission power is directed towards the passenger space of the vehicle and minimized outside the passenger space.

The controller 110 can be further configured to implement a Bluetooth connection algorithm by the processor and stored in the memory such that, once established, a connection to passenger wireless device 120 can be automatically re-established without notification or permission to the wireless device 120. This advantageously permits a connected passenger to move about the vehicle, return to his or her seat, and have audio seamlessly resume.

The controller 110 can be further configured to negotiate Bluetooth audio connections to the lowest possible power level to thereby minimize a transmission power of wireless devices 120 during protocol transmissions and minimize a transmission power of aircraft device during protocol and audio transmissions.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A controller for one or more wireless networks that is configured to maximize a number of simultaneous Bluetooth audio connections within a vehicle, the controller comprising:

a processor including one or more cores; and a memory;

wherein the processor is configured so that upon receipt of a request for connection by a passenger wireless device to one of a plurality of access points disposed within the vehicle forming a wireless network, the processor prioritizes connecting the passenger wireless device to a 5GHz band of the wireless network instead of a 2.4 GHz band;

wherein the processor is further configured to dynamically distribute a population of the wireless devices connected in a 2.4GHz band across the plurality of access points and across a set of channels to maximize wireless channel availability; and wherein the processor is further configured to reduce a transmit power of aircraft Bluetooth equipment to minimize a radius of frequency reuse, based on a function of a number of wireless devices connected within a geographic region of an access point;

wherein the processor is further configured to implement a directional antenna for the aircraft Bluetooth equipment such that the transmit power is directed toward a passenger space of the vehicle and minimized outside the passenger space; and wherein the processor is further configured to implement a Bluetooth connection algorithm such that, once established, a connection between one of the access points and a wireless device is automatically re-established without notification to the wireless device.

2. The controller of claim 1, wherein the processor is further configured to negotiate Bluetooth audio connections with the wireless devices to a lowest possible power level to minimize a transmit power of each connected wireless device during protocol transmissions and the transmit power of aircraft Bluetooth equipment during protocol and audio transmissions.

3. The controller of claim 1, wherein the processor is further configured to provide for independent and dynamic transmit power control for an aircraft audio source.

* * * * *